April 8, 1941.  F. R. BROWN  2,237,875
CHUCK JAW
Filed Feb. 8, 1938

INVENTOR
FREDERICK R. BROWN
BY Georges Hasting
ATTORNEY

Patented Apr. 8, 1941

2,237,875

UNITED STATES PATENT OFFICE 2,237,875

CHUCK JAW

Frederick Russell Brown, Brooklyn, N. Y., assignor to American Machine & Foundry Company, a corporation of New Jersey Application February 8, 1938, Serial No. 189,315

3 Claims. (Cl. 279—66)

This invention relates to an appliance of the nature of a chuck, using that term in its broadest sense as a generic designation for a holding device, whether for use as a tool-holder, for example a "drill chuck," "tapping chuck," etc., or as a holder for work in a lathe, or otherwise for use as an adjunct for machine tools, or as a holding device of equivalent or analogous function or purpose.

Primarily, the improved appliance constituting the subject of the present application may be regarded as an improvement upon the "tap holder chuck" disclosed in the application for Letters Patent, Serial No. 93,180, dated July 29, 1936, of Carl W. Johnson, now Patent No. 2,159,162 issued May 23, 1939, and the present invention is of special utility when embodied in a tool of that character, although it is capable of general employment where provision is required for effecting a positive and secure grip upon an attached part.

An object of the invention is to provide an appliance of the above character which will hold securely the shank of a drill or tap having a squared tang.

Another object of the invention is to provide a holding appliance of the class described with which the device to be held can be readily assembled, which will remain in condition to insure accurate alignment of the device held therein after considerable wear and tear of the parts such as will be encountered in the intended use, and which can be manipulated with only such skill as may be expected from the average workman.

Other objects and features of the invention will appear as the description of the particular physical embodiment selected to illustrate the invention progresses.

In the accompanying drawing, like characters of reference have been applied to corresponding parts throughout the several views which make up the drawing, in which.

Figure 1:
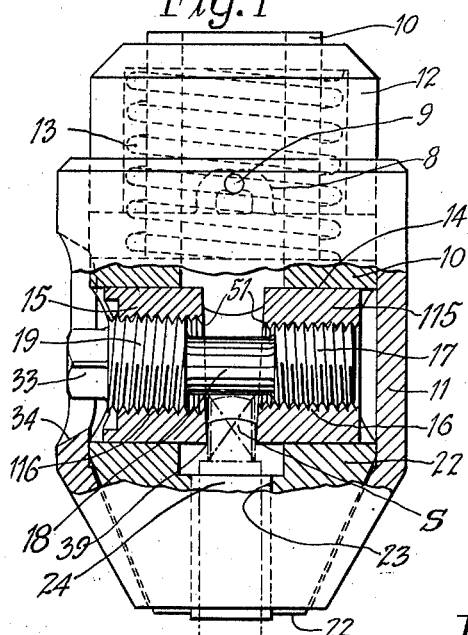
Fig. 1 is a view in vertical section, partly in elevation, of a tap holder chuck in the construction of which the present invention has been embodied.

In the now-preferred embodiment of the invention selected for illustration and description, the part designated by the reference character 10 is the body member of a tap holder chuck, such as that illustrated in greater detail in the above-mentioned application for Letters Patent, and there described at length, only so much of the structure of said tap holder chuck being herein shown as will permit a ready and complete understanding of the means by which the present invention may be embodied in an appliance of such a known and illustrative type.

In the instance shown, the body 10 is of cylindrical form, and is disposed in telescopic relation with a shell 11 of which the portion surrounding the body 10 is of tubular, cylindrical form, closed by a cap 12 which confines the coil spring 13. Shell 11 is provided with removable pins 9 which project into bayonet slots 8 in cap 12 and allow easy removal of said cap from the assembly. The forward end of the shell is formed with a conical nozzle 7, and the inner tapering walls 6 of this nozzle confine centering members 24, which may be of any suitable form, and which may desirably take the known form shown, including a pair of sliding jaws disposed in the same general vertical plane diametrically across the nose 22 of the part 10, occupying guideways 5 in which the jaws are mounted to slide radially, being provided with tapering edges 4 which match the inner tapered walls 6 of the nozzle, so that when the shell 11 is moved upwardly along the major axis of the appliance, as by the spring 13, the jaws 24 are cramped inward radially into retentive engagement with opposite sides of the cylindrical portion of the shank of a tap S, this being the tool illustrated, by way of example, as the device to be held by the appliance.

Thus far, the parts described are of the form illustrated in the above-mentioned co-pending application for Letters Patent, as is also, in its general aspect, the mechanism for engaging and holding the squared tang to which the lead line from the reference character S is extended in the several figures of the drawing.

That is to say, provision is made, as in the aforesaid application for Letters Patent, of a pair of gripping members, 15 and 115, movable transversely of the body member 10 in a slot 14, of suitable contour to afford a path for the gripping members as the latter are adjusted inwardly or outwardly by an operator member 18 which has enlarged threaded end portions 17 and 19, screwed into suitable threaded bores or sockets 16 and 116 of the gripping members 15 and 115, for which operation a suitable tool may be applied to the squared end 33 of operator member 18. The threaded end 19, and its co-operating socket 116, are somewhat larger than the other threaded end 17 and socket 16, for the purpose of making it easy to assemble the parts, and to disassemble them.

When the operator member 18 is rotated clockwise, the gripping members 15 and 115, are caused to approach each other and to grip the contiguous faces of the squared shank S of the tap, while rotation counterclockwise of the operator member 18 retracts the grippers 15 and 115, freeing the shank S.

Figure 2:
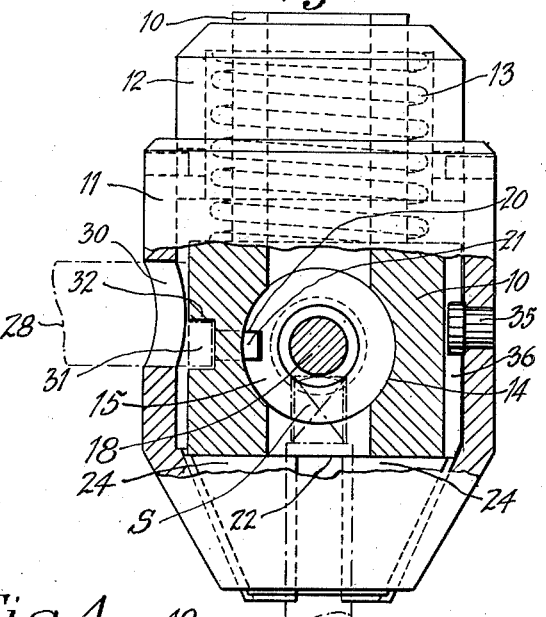
Fig. 2 is a view in partial sectional elevation of the appliance shown in Fig. 1.

When so freed, the jaws 24 may have their gripping pressure relieved by retracting the shell 11 outwardly along the major axis of the appliance, use being made of a suitable tool, as for example that indicated by dotted lines at 28 in Fig. 2, inserted through a side orifice 30, provided for that purpose in the shell 11.

The tool 28 has a projection 31 which enters a slot 32 in the body 10, so that upon rotation of the tool 28 the shell 11 is moved downwardly against the yielding action of the coiled spring 13 by which the shell is normally biased upwardly and which also causes pressure of the forward end 22 of the body 10 against the upper edges of the jaws 24 and thereby forces them downwardly, and the tapered surfaces 4 and 6 co-act to cramp the jaws 24 inwardly against the shank of the tap, as already described.

It will be noted that provision is desirably made of a recess 20 in which a pin or dowell 21 can be entered to hold the operator member 18 in its adjusted rotative position and also that a pin 35 is desirably provided in the wall of the shell, to be engaged with a guide slot 36 in the body 10, to prevent relative rotation as between the body and shell.

In pursuance of an important object of the invention, provision is made for gripping the squared shank S of the tap in a manner which is novel and which has been devised to avoid the insecurity that has hitherto characterized the action of analogous grippers in similar appliances. These have been unsatisfactory in the respect that their gripping faces, when formed in substantial parallelism with the conventional straight-sided shank faces 29 of the tap tang S, exhibit a tendency to rock inwardly, so that they not only fail to grip the tang firmly, but appear to exert in effect an outwardly crowding action thereon. This is aggravated by the ordinary wear and tear which is encountered in use, so that the performance of a tap drill chuck of this type has fallen short of optimum efficiency in its intended use.

Figure 4:
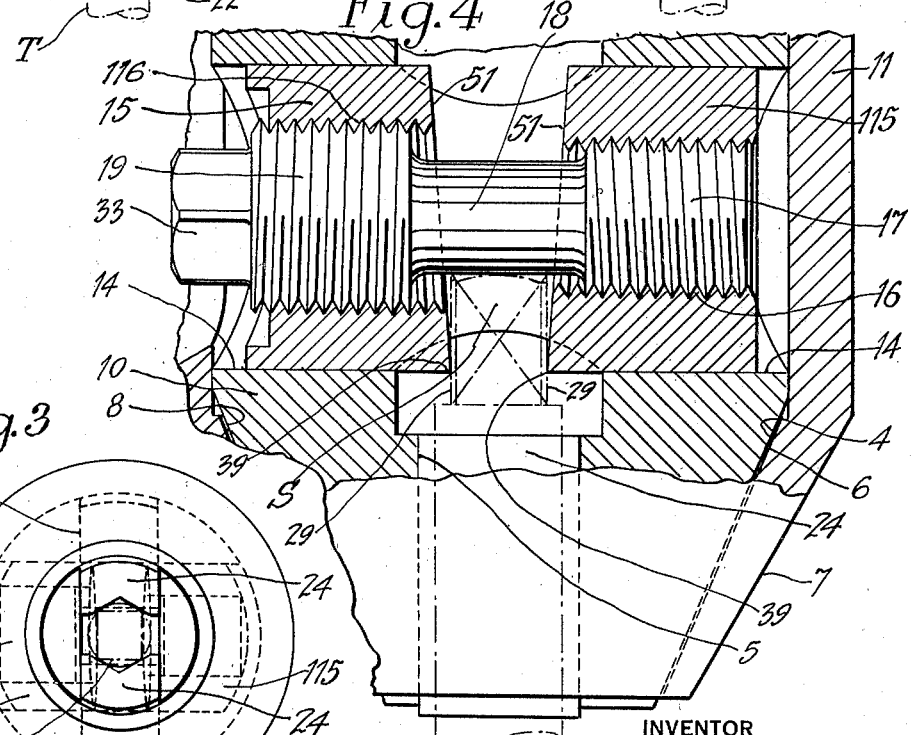
Fig. 4 is a fragmentary, detail view in vertical section, taken upon an enlarged scale, of the interior construction of the novel gripping members constituting part of the present invention.
Figure 3:
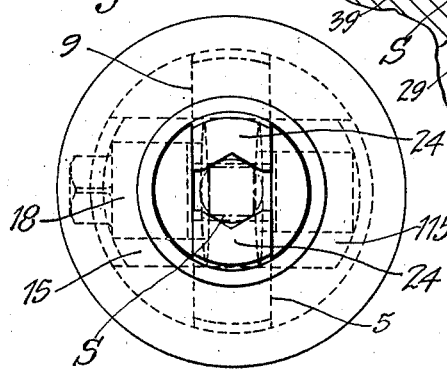
Fig. 3 is a bottom view of the appliance shown in Fig. 1.

This tendency has been wholly eliminated by the novel disposition, which the present invention makes, of the inwardly directed walls or faces 51 of the gripper members 15 and 115, these faces being inclined convergently to a sensible degree downwardly and inwardly as clearly shown in Fig. 4, so that they present edges 39 designed to be first engaged with the contiguous faces 29 of the tap-tang S.

The angle of convergence may vary from that of the illustrative embodiment, which has been somewhat exaggerated for the sake of clearness in the drawing, and those skilled in the art will readily determine the most effective angle to adopt for different types of chuck structure, but in the present construction about half a degree of inclination has been found to give satisfactory results.

From observation of the improved gripping members in the course of use, it appears that when these grippers members 15 and 115 are moved along their threaded operator member 18, their bottom edges 39 thus first contact the tang S and then the upper portions tend to come against the upper margin of the tap head and also tend to create a canting action of the gripping members so that their threaded socket walls 16 and 116 bind on the threaded adjusting portions 17 and 19 of the operator member 18 on which they are mounted.

This action results in a surprisingly firm grip upon the tool, which grip is not affected by use, and apparently the wear on the threaded parts of the gripping member has no appreciable effect on their satisfactory operation, as the jaws hold securely at all times.

From the foregoing disclosure it will be further apparent to those skilled in the art of making holding appliances for various purposes that the basic idea of means underlying the present invention is susceptible of employment for many purposes other than that of the particular physical embodiment which has been illustratively described as having benefited by such application of the invention in commercial use.

What is claimed is:

1. A holding appliance of the class described, having a body provided with jaws adapted to be engaged circumferentially with the shank of a device such as a tap drill, which terminates in a tang formed with flat faces substantially parallel with the major axis of the device, and a plurality of gripping members adapted to be approached toward each other and into contact with said tang near the end thereof, said gripping members being formed with gripping faces converging toward said lengthwise axis of the tool away from said end, and adapted to be engaged with said tang first at a region remote from said end when approached to the tang.

2. A holding appliance of the class described, having a body provided with jaws adapted to be engaged circumferentially with the shank of a device such as a tap drill, which terminates in a tank formed with flat faces substantially parallel with the major axis of the device, and a plurality of gripping members adapted to be approached toward each other and into contact with said tang near the end thereof, said gripping members being formed with gripping faces converging toward said lengthwise axis of the tool away from said end, and adapted to be engaged with said tang first at a region remote from said end when approached to the tang, and then to be canted forcibly into full-faced engagement with said tang toward said end.

3. A chuck device comprising a shell having a top end and an end with an axial tool-receiving opening, a set of jaws movable radially toward and away from said tool opening to align said tool along its working axis and also to clear the tool for removal, a screw bolt associated with said body, and a set of gripping members threaded upon said screw bolt and having convergently inclined gripping faces to be engaged with the head of the tool, said jaws and gripping members co-operating to hold the tool against rotative, axial and lateral displacements, and said gripping members being adapted to be canted from positions in whch their leading edges respectively are exclusively engaged with the head of the tool, to positions in which the broader faces of the gripping members, adjoining said edges, are applied to the tool-head, while the positions of said gripping members threaded upon said screw bolt are cramped thereon, and so held from adventitious displacement from their gripping position.

FREDERICK RUSSELL BROWN.